United States Patent [19]

Grappo

[11] Patent Number: 5,427,426
[45] Date of Patent: Jun. 27, 1995

[54] SEAT ACCESSORY

[76] Inventor: Donald T. Grappo, 17 Yosemite Ave., Oakland, Calif. 94611

[21] Appl. No.: 151,806

[22] Filed: Nov. 15, 1993

[51] Int. Cl.$^6$ ............................................. B60N 1/10
[52] U.S. Cl. .................................. 296/65.1; 297/242; 297/344.26
[58] Field of Search ........... 297/240, 242, 337, 394.26, 297/452.25, 452.55, 452.24, 452.23; 296/65.1

[56] References Cited

U.S. PATENT DOCUMENTS

| D. 142,800 | 11/1945 | Watson | 297/452.23 X |
|---|---|---|---|
| 476,238 | 6/1892 | Bauer | 297/452.25 |
| 731,778 | 6/1903 | Holtzmuller et al. | 297/452.25 |
| 800,458 | 9/1905 | Martin | 297/452.25 |
| 1,004,589 | 10/1911 | Pridmore | 297/452.25 |
| 2,208,745 | 7/1940 | Bloomberg | 297/452.25 |
| 2,347,538 | 4/1944 | Bloomberg | 297/452.24 |
| 2,380,102 | 7/1945 | Farmer | 297/452.24 X |
| 2,576,004 | 11/1951 | Fair | 297/240 X |
| 3,043,622 | 7/1962 | Milner | 297/240 |
| 3,138,404 | 6/1964 | Newton | 297/452.24 X |
| 3,232,662 | 2/1966 | Graves | 297/240 X |
| 3,376,070 | 4/1968 | Johnson | 297/452.25 X |
| 3,459,449 | 8/1969 | Klausen | 297/452.25 X |
| 3,712,670 | 1/1973 | Suehla et al. | 297/452.55 X |
| 3,740,096 | 6/1973 | Bridger | 297/452.25 |
| 4,034,947 | 7/1977 | Geisel | 297/240 X |
| 4,792,188 | 12/1988 | Kawashima | 296/65.1 X |
| 5,301,993 | 4/1994 | Zalewski | 296/65.1 |
| 5,318,339 | 6/1994 | Cherniak | 296/242 X |

FOREIGN PATENT DOCUMENTS

| 1112317 | 3/1956 | France | 297/240 |
|---|---|---|---|
| 2170700 | 8/1986 | United Kingdom | 297/240 |

OTHER PUBLICATIONS

Advertisement for "Auto Swivel Cushion" and Spring-action lifter seat (Ref A), undated.
Specification Sheet for a Lazy-Susan bearing (ref B), undated.

*Primary Examiner*—Joseph Pape
*Attorney, Agent, or Firm*—Terry M. Gernstein

[57] ABSTRACT

A seat accessory is used to assist a user in entering and exiting a vehicle and includes a seat element mounted on a base element by a bearing, such as a lazy-susan bearing. The seat element includes a planar center section, a wall section and a leg support section. The seat is saddle shaped and tilts a user back toward a rear section of the wall which is sized and shaped to support that user in a comfortable traveling position. The accessory includes stops so the seat element will tend to remain in a transfer position or in a traveling position as desired without the user exerting force on the seat element. A second form of the seat accessory includes a front section that is nearly planar and has a back section that is higher than the back section of the first form of the seat accessory.

14 Claims, 7 Drawing Sheets

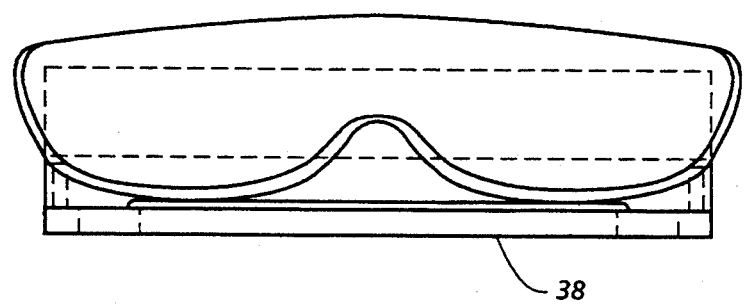
FIG. 3
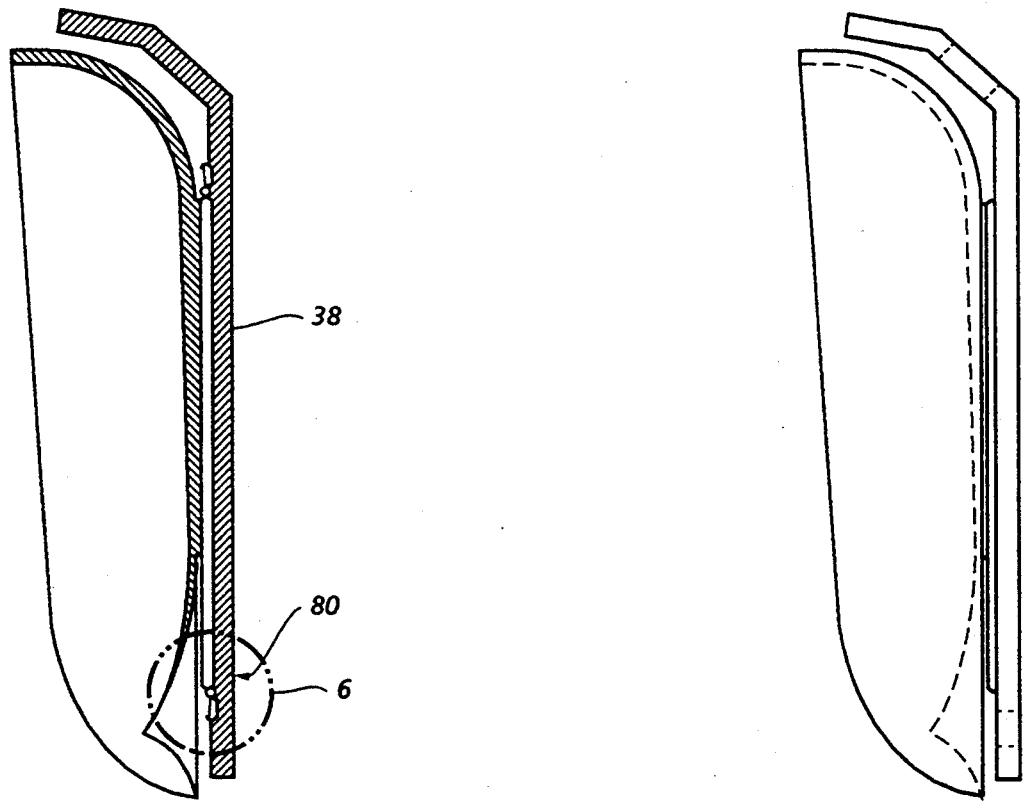
FIG. 4
FIG. 5
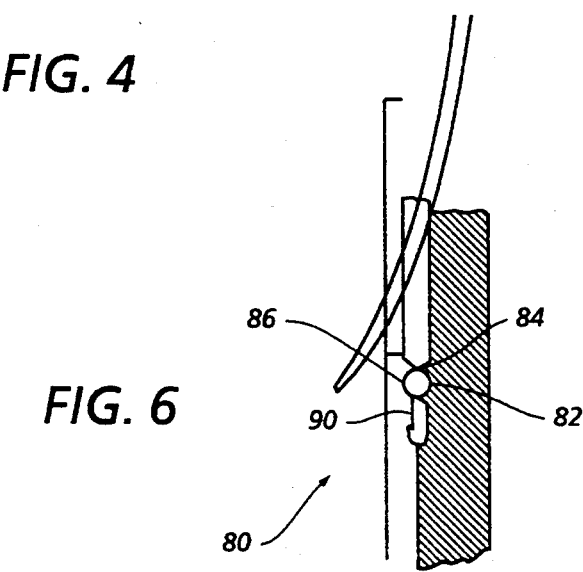
FIG. 6

SEAT ACCESSORY

TECHNICAL FIELD OF THE INVENTION

The present invention relates to the general art of seats, and to the particular field of vehicle seats.

BACKGROUND OF THE INVENTION

In modern life, commuting is a way of life. Many people spend long hours commuting, either to and from work, or to and from meetings, or even to and from vacations. Other people find it necessary to enter and leave a vehicle many times each day. This is especially so for many salespeople.

Many people, especially elderly people, find it difficult and uncomfortable to enter and exit a vehicle, while other people, due to back problems, or the like, find it uncomfortable to sit for long periods of time in a vehicle. It has been stated that entry and exit from a passenger car is one of the most varied physical activities people perform on a daily basis. According to various ergonomic analyses, the body has to perform an articulated motion that includes practically every bone and muscle. The shifting of the weight has to be synchronized with a simultaneous twisting and bending of the back, while bending the knees, tilting the head, and giving support by use of the hands. This task is usually performed with no defined hand grips, so the passenger has to improvise the sequence of this maneuver. Furthermore, the planning of the entry into and exit from the vehicle has to be based on assessment of distances, loads, and one's manual abilities. The observations necessary to accomplish the maneuver are in real time, and differ with each car, location (in regard to the geometry and qualities of the surface on which one stands or is about to stand), and the lighting conditions. Still further, the ability to apply muscular power simultaneously and with accuracy has to bring into account the reduced abilities of a growing segment of the population in need of transportation.

For these reasons, the art has included some devices for facilitating entry into and exit from vehicles, such as automobiles, and the like. However, these devices suffer several drawbacks. For example, some of the known devices are not secured in place and may move while in use. This can not only be uncomfortable, but it can be distracting. Still further, some of these known devices are actually uncomfortable, especially if used for long periods. That is, while they may facilitate entry or exiting from a vehicle, they may not be comfortable to use, especially if the user must exert some effort to maintain the device in proper position.

In contemporary car design, there are many trends of negative impact on the ease of entry and exit. The overall height of vehicles has been reduced continually so that the setting is lower and is tilted back more. The headroom is lower and the door clearance is also tighter. The materials and configuration of car seats have changed with the purpose of increasing the friction between a passenger and the seat. Therefore, the confinement of a passenger is increased. This means that once the body weight is fully resting on the seat, one has to twist into a forward position in spite of the "bucket seat" design and the use of roughly upholstery fabrics.

Therefore, there is a need for a seat accessory that is secure and comfortable, yet facilitates entry into and exit from a vehicle, especially modern vehicles.

While fulfilling the just-mentioned needs, the accessory should also be inexpensive to purchase and easy to fit into a vehicle. The device should also be easy to maintain. Otherwise, the device may meet with resistance to commercialization.

OBJECTS OF THE INVENTION

It is a main object of the present invention to provide a seat accessory for a vehicle that facilitates entry to and exit from the vehicle.

It is another object of the present invention to a seat accessory for a vehicle which is comfortable to use, both for movement into and out of the vehicle, but for riding in the vehicle as well.

It is another object of the present invention to a seat accessory for a vehicle which is secure and stable.

It is another object of the present invention to a seat accessory for a vehicle which is inexpensive to purchase, easy to maintain and easy to install in a vehicle.

SUMMARY OF THE INVENTION

These, and other, objects are achieved by a seat accessory for a vehicle which includes a base that is attachable to a vehicle using simple straps, is ergonomically designed for comfort, and stably maintains entry and traveling orientations when desired. The device of the present invention allows a user to begin the seating process while looking away from a vehicle. This will allow for full use of both hands to control the movement. After being seated safely, the passenger can lift one leg at a time (or both at once, if desired) into the vehicle while twisting into a forward position. Furthermore, the device of the present invention reduces the maneuver of entering or exiting a vehicle into two segments, thereby simplifying the procedure. The device allows time for eye adjustment from the outside light to the dark interior of a vehicle. The device also reduces the power requirement for a twisting motion associated with the application of new upholstery materials which are textured for friction. The device of the present invention allows for support of body weight on both hands while simultaneously easing the body into the seat.

The seat accessory includes a lazy-susan bearing and a saddle-shaped seat mounted on a base by the lazy-susan bearing. The saddle shape makes the seat comfortable yet secure, and the base strapped to the seat makes the accessory stable and easy to install. The accessory includes stop means so it will stably maintain an entry orientation and also stably maintain a traveling orientation.

The accessory is formed of plastics-type material so it is inexpensive to manufacture and easy to maintain.

It is noted that the slight added height that results in the use of the device of the present invention is well within the parameters of height adjustments currently installed in car seats.

The angle of the seat in relation to the floor of an automobile is carefully calculated, and is based on ergonomic studies so the passenger will remain comfortable and the advantages of modern vehicle seat design will not be vitiated by use of the device of the present invention.

BRIEF DESCRIPTION OF THE DRAWING FIGURES

FIG. 3 is a front elevational view thereof.

FIG. 4 is a cross-sectional view thereof taken along line 4—4 of FIG. 2.

FIG. 5 is a side elevational view thereof, the other side being a mirror image of the side shown.

FIG. 6 is a detail view as indicated in FIG. 4.

DETAILED DESCRIPTION OF THE PREFERRED EMBODIMENT OF THE INVENTION

Shown in FIGS. 1–8 is a seat accessory 10 embodying the present invention. The accessory 10 can be used in any vehicle, including, but not limited to, automobiles and other land vehicles, water vehicles, including boats, as well as airplanes.

Figure 1:
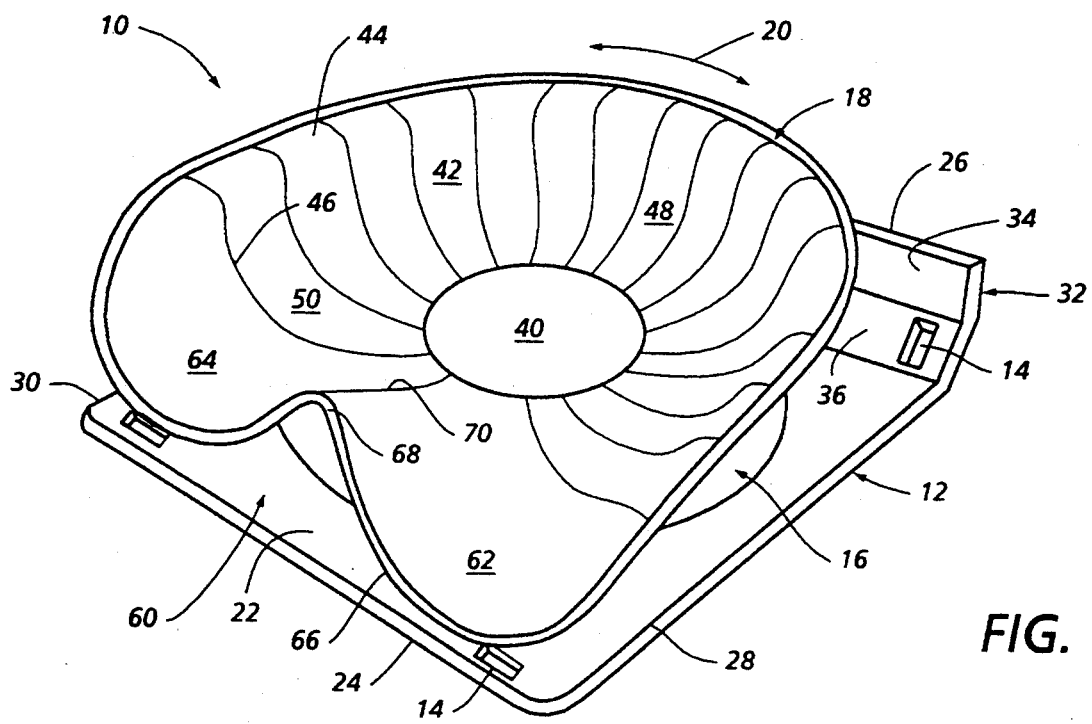
FIG. 1 is an assembled perspective view of the seat accessory.
Figure 2:
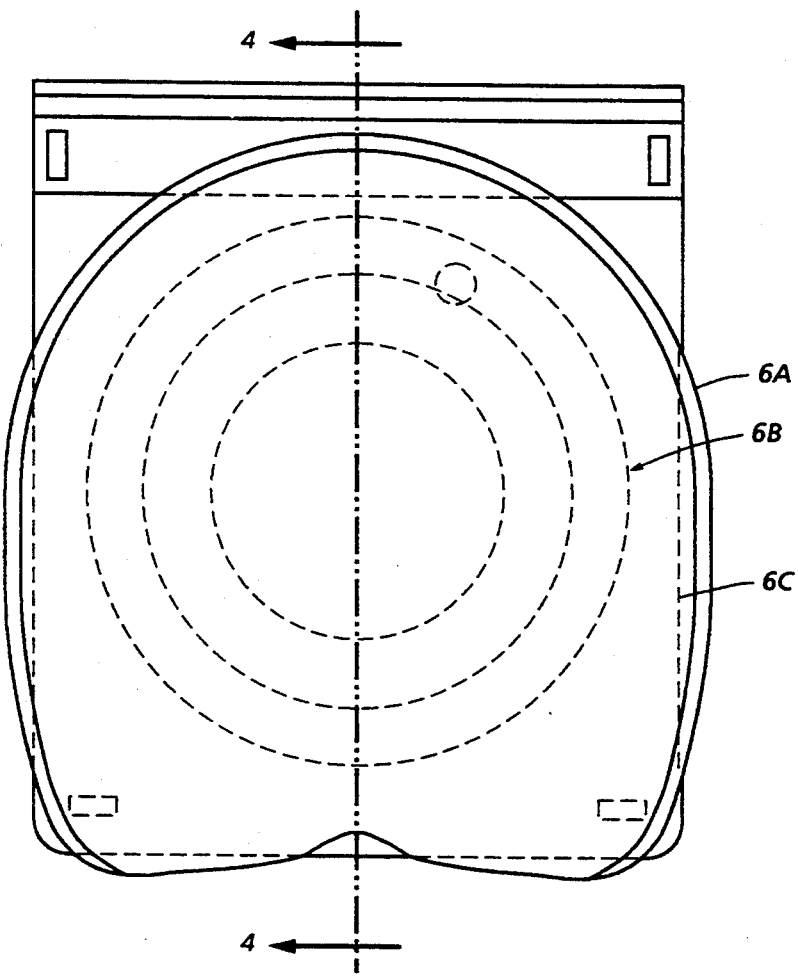
FIG. 2 is top plan view thereof.
Figure 7:
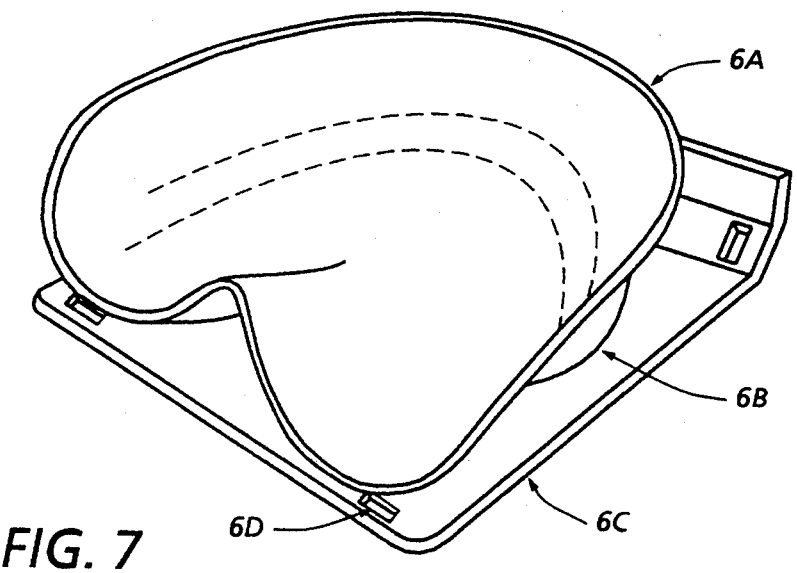
FIG. 7 is a front, top and side perspective view of the seat accessory in the driving orientation.
Figure 8:
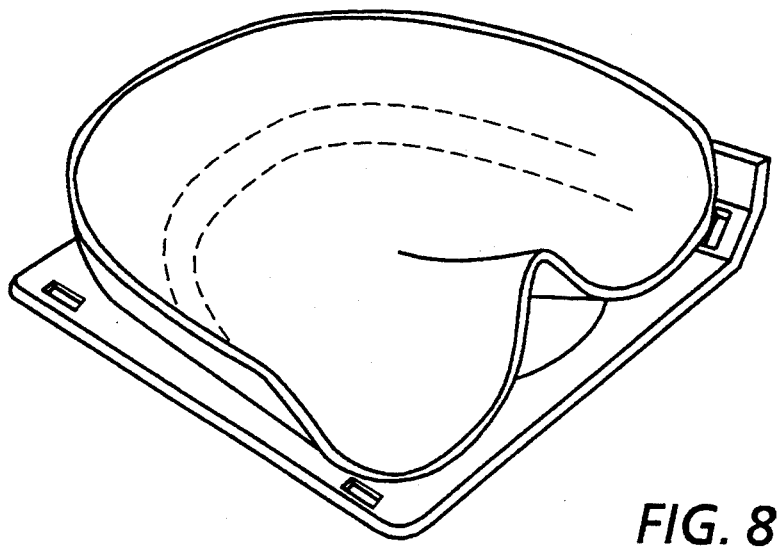
FIG. 8 is a front, top and side perspective view thereof in the transfer orientation.

Generally, the accessory 10 includes a base element 12 that is securely attached to a vehicle seat, by straps extending around that vehicle seat and through strap-receiving holes 14. A lazy-susan bearing 16 is mounted on the base element and a seat element 18 is mounted on the lazy-susan bearing for rotation therewith relative to the base element. The rotation of the seat element is indicated in FIG. 1 by double-headed arrow 20 and is in a plane parallel to the plane containing the base element. As is best shown in FIGS. 7 and 8, the seat element rotates relative to the base element between a transfer position, shown in FIG. 8 in which the user initially seats himself or herself into the accessory, and a traveling orientation shown in FIG. 7 in which the user rides as the vehicle moves. In the preferred form of the invention, the transfer and traveling orientations of the seat element are separated by 90°. The seat can be left or right handed, depending on which side of the vehicle it is located. The preferred form of the accessory is made of plastics-type materials, with the lazy-susan bearing being steel. Straps need not be used since the device will be used in conjunction with a seat belt; however, strap-receiving holes 14 are shown for completeness of disclosure. Structural supports can also be included, and will be steel.

Specifically, base element 12 includes a planar section 22 having a front edge 24, a rear edge 26 and two identical side edges 28 and 30. There are four holes 14, each located adjacent to an edge. Base element 12 further includes a rear section 32 comprised of an end section 34 and a transition section 36. Rear edge 26 forms a top rim that is in a plane parallel with the plane of section 22. Transition section 36 is angled with respect to planar section 22 so that the rear portion of the base element will fit snugly into the intersection of a vehicle back and seat if desired. Base element 12 can include a roughened bottom 38 to be non-slip when placed on a vehicle seat.

As is shown in FIGS. 1, 7 and 8, the seat element 18 includes a planar center section 40 and a wall 42 that extends around the center section for 180°. Wall 42 includes a top rim 44 that extends radially away from the center section in a plane that is parallel to the plane containing the center section. One form of the invention has rim 44 planar and another form has rim 44 arcuate. An arcuate wall section 46 connects the top rim to the center section and curves on a circular radius to smoothly connect the top rim to the center section. As will be understood from the ensuing disclosure, the radii of curvature of wall section 46 are smaller near rear portion 48 than near front portion 50. The sharper curvature in the rear of the seat element makes it comfortable as it provides more back support than if the curvature were uniform.

In one form of the invention, seat element 18 has a front section 60 that includes two identical leg support sections 62 and 64. Each leg support section is multiply curved in several planes so it curves towards center section 40 from forward edge 66 and towards rim 44, which, itself, curves downwardly toward base element 12. The leg support sections are concave as viewed from the top and are connected by an arcuate divider section 68 that is convex as viewed from the top. The radius of curvature of the divider section is much sharper than that of the leg support sections, and curves from front edge 66 to center section 40 along top 70. The leg support sections also slope back from the front edge 66 toward the center section 40 so a user is gently tilted back toward the rear wall which is taller than the other portions of the wall so the user is tilted toward the location of greatest support.

The multiple curves in the seat section produce a saddle-like appearance, and in combination with the planar center section, are ergonomically arranged so a user can easily enter the seat but will be securely and comfortably supported while using the seat. The multiple curves of the leg support sections form a hyperbolic-parabaloid so the seat is not exactly like a saddle but is similar. Thus, the term "saddle-like" is not intended to be strictly interpreted as being a saddle, but is used for convenience of description.

Figure 9:
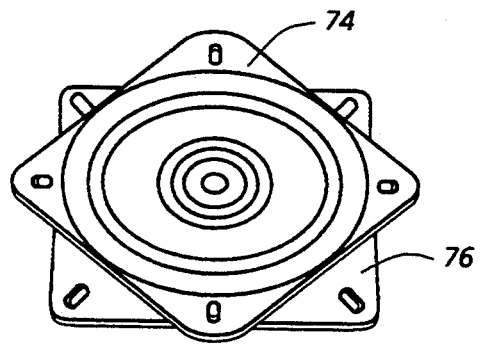
FIG. 9 is a front, top and side perspective view of a lazy-susan bearing used in the seat accessory.
Figure 10:
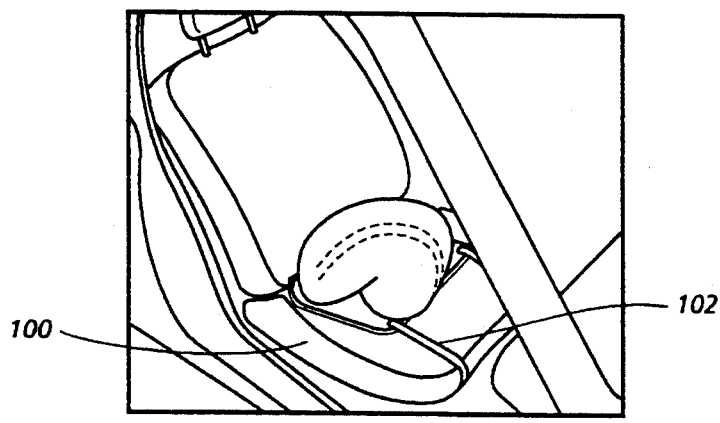
FIG. 10 illustrates the seat accessory in place in a vehicle in the transfer orientation.

Seat element 18 is attached to base element 12 by lazy-susan bearing 16, which is best shown in FIG. 9. Lazy-susan bearing 16 includes two plates 74 and 76 connected together by a bearing means so plate 74 can rotate with respect to plate 76. Plate 76 is fixed to base element 12 and plate 74 is fixed to seat element 18. Plates 74 and 76 can be plastic or metal as desired. The lazy-susan bearing is well known in the furniture art, and thus will not be described in detail. Other forms of swivel bearings can also be used without departing from the scope of the present disclosure, and the lazy-susan form of the connection is only the preferred form of such connection.

To ensure that the seat element stops in the proper orientation, device 10 includes a stop means 80, best shown in FIGS. 4 and 6. The stop means includes a first portion located adjacent to front edge 24 and a second portion located adjacent to side edge 28. Each portion includes a depression 82 defined in top surface 22 of base element 12. A roller bearing 84 is attached to seat element 18 for movement therewith and is biased into rolling contact with top surface 22 by a spring cage 86. The depressions are connected together by an arcuate track defined in surface 22. The spring force exerted by the cage is sufficient to snap the ball into a depression and hold the ball in the track, but not sufficient so removal of the ball from a depression is unduly difficult. The stop means is intended only to keep the seat oriented in a desired orientation, so a user need not exert muscle pressure to keep the seat in place during use. Downward spring force can be relieved by a tab 90 to permit movement of the seat out of one of the two end orientations.

Figure 17:
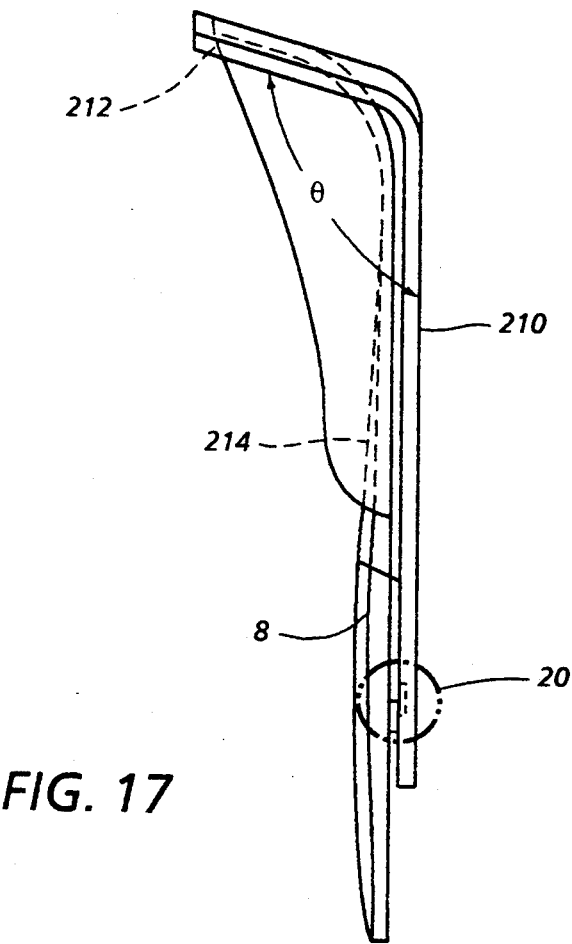
FIG. 17 is a side elevational view of the FIG. 14 seat accessory, the side opposite being a mirror image of FIG. 17.
Figure 18:
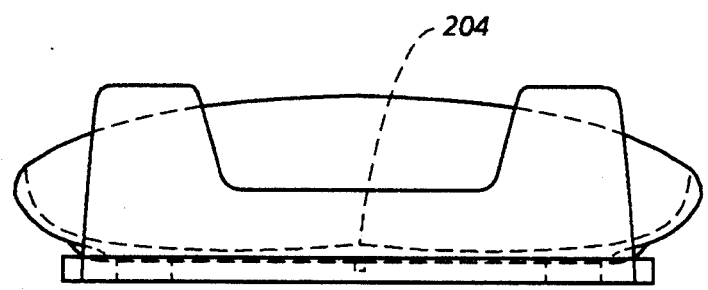
FIG. 18 is a rear elevational view thereof.
Figure 19:
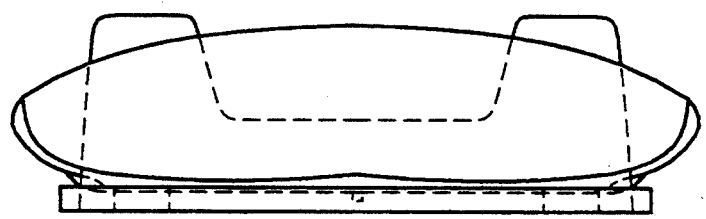
FIG. 19 is a front elevational view thereof.
Figure 20:
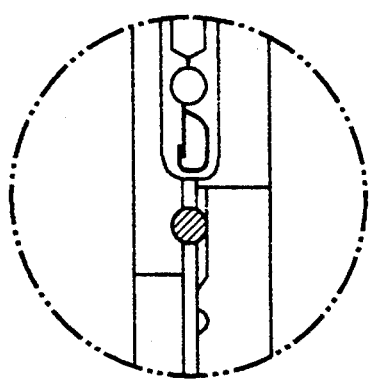
FIG. 20 is an enlarged showing of detail A shown in FIG. 17.

The gravitational force is applied to a user not downwards in the middle of the device, but backwards and diagonally. This is accounted for in the accessory 10 by making the back retaining wall of the seat base higher, and the morphology of the back segment may be more crucial in design than the element 68. The mandatory use of seat belts may also reduce the importance of element 68. Therefore, in some designs, this element can be omitted. Therefore, an alternative form of the accessory is shown in FIGS. 14–20 which omits the element 68. Accessory 200 includes a rear portion 48' that is higher than rear portion 48 and has a curved section 202 that curves in two planes to connect the rear portion 48' to a front portion 50' having a sinuous front edge 66'. Seat 200 includes a planar portion 40' that is much larger than portion 40. As can be seen in FIGS. 18 and 19, front portion 50'is nearly planar, with only a slight undulation 204.

It is noted that the seat accessory is low enough in profile so it can be used by a driver, even if the steering wheel is in a low position. As can be seen for accessory 200, the height profile as measured between top surface 206 and bottom surface 208 is quite low to place the user's thighs close to the vehicle seat. In the preferred form of the invention, the accessory has a tilt angle of 7° as indicated in FIG. 17 at angle α. The base 210 of the accessory is parallel to the vehicle seat, therefore the comfort of the user is not compromised. The angle between the back rest surface 212 and the seat surface 214 is represented by angle Θ is between 105° and 107° off horizontal. This angle ensures that the back of the seat will be oriented at an angle that is proper to tilt the user into the most comfortable orientation and to be sure that the seat back and the car seat back are closely aligned whereby there is little, if any, discontinuity between the accessory and the vehicle seat back. This ensures that the accessory will cooperate with the design of the vehicle seat for maximum rider comfort. The space between the back of the seat and the back of the auto seat is minimized using the accessory of the present invention. Thus, the seat back and the back of the accessory form a nearly continuous line thereby allowing for as much support as possible for the user's lower back. The base of the accessory is designed to accommodate the seats of most automobiles, and the preferred form of the accessory has a width of thirteen inches.

Figure 11:
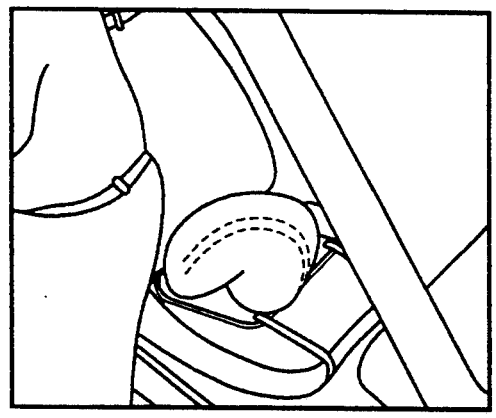
FIG. 11 illustrates a user in relation to the seat accessory as the user is about to enter the vehicle.
Figure 12:
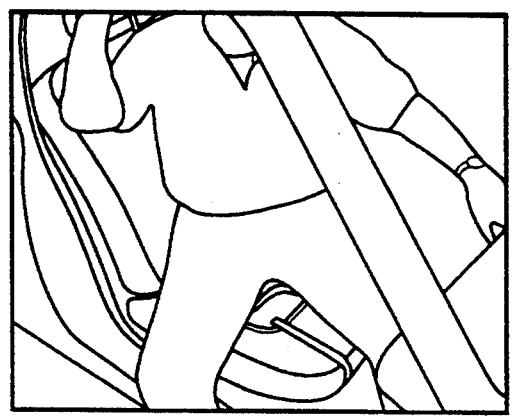
FIG. 12 illustrates a user initially seating himself on the accessory during the transfer operation.
Figure 13:
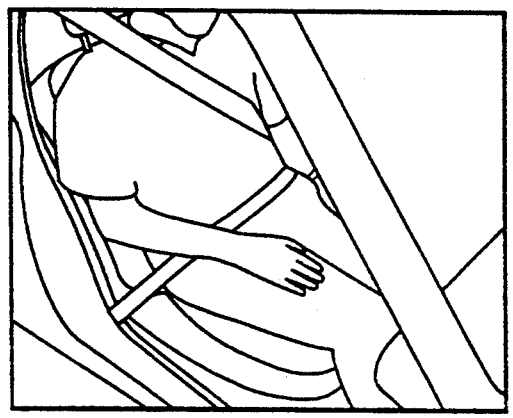
FIG. 13 illustrates the user in the traveling orientation.
Figure 14:
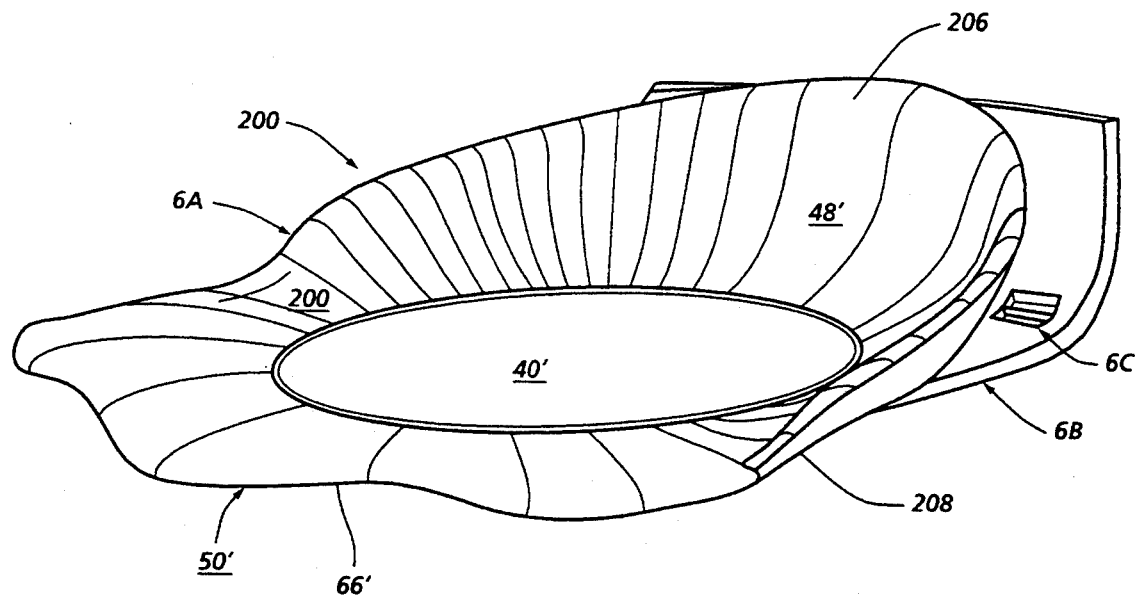
FIG. 14 is an assembled perspective view of an alternative form of the seat accessory.
Figure 15:
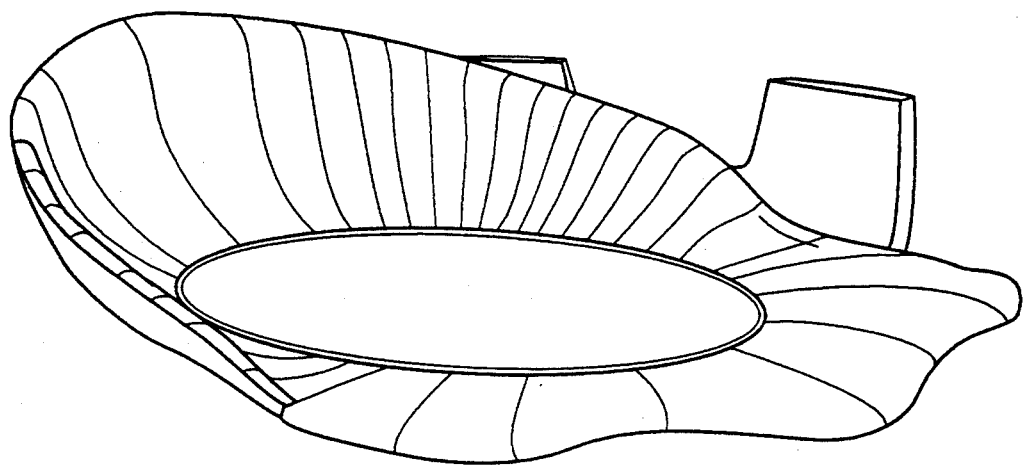
FIG. 15 is an assembled perspective view of the seat accessory shown in FIG. 14 in a position rotated 90° from the position shown in FIG. 14.
Figure 16:
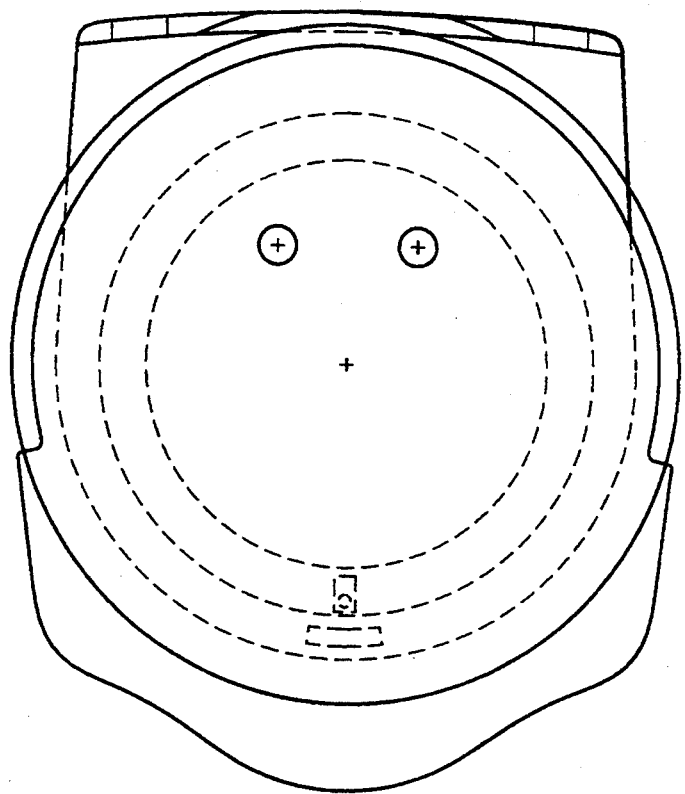
FIG. 16 is a top plan view of the FIG. 14 seat accessory.

Use of accessory 10 is illustrated in FIGS. 10–13. Accessory 200 is used in an identical manner, and thus will not be described. Accessory 10 is anchored to vehicle seat 100 by straps 102. Straps 102 are shown connected to the front of base element 12 in the figures, but could also be attached to the rear of that base element if desired using the rear strap-receiving slots with the straps surrounding the seat. Seat element 18 is oriented in the transfer orientation in FIG. 10 to be open outwardly of the vehicle. As shown in FIG. 11, a user enters the seat element in the manner of a chair, then, as can be understood by comparing FIGS. 12 and 13, swivels toward a traveling orientation. Once in the traveling orientation, as shown in FIG. 13, the user simply places the vehicle seat belt around himself or herself in the normal manner. Stop means 80 ensures that the seat will remain in the FIG. 10 transfer orientation when the user is not in the seat, and will tend to remain in the FIG. 13 travelling orientation during use.

It is understood that while certain forms of the present invention have been illustrated and described herein, it is not to be limited to the specific forms or arrangements of parts described and shown.

I claim:

1. A seat accessory for use in a vehicle to assist entry and exit of that vehicle, comprising:
   A) a base element having strap-receiving slots locate adjacent to two side edges of said base element, a front edge and a top surface;
   B) a bearing mounted on said base element to swivel with respect to said base element between a transfer position to initially receive a user and a traveling position oriented to face the user forward of vehicle motion;
   C) a seat element mounted on said bearing for movement therewith, said seat element including
      (1) a center section,
      (2) a wall extending around said center section for 180°, said wall having a top rim located above said center section,
      (3) an arcuate wall section connected to said wall, and
      (4) a front section which includes
         (a) two arcuate leg support sections which are curved in a plane different from the curvature of said arcuate wall section, and
         (b) an arcuate divider section connecting said arcuate leg support sections together and having a radius of curvature which extends in a direction different from the radii of curvature of said leg support sections;
   D) stop means for stopping said seat element in said transfer position and in said traveling position and including
      (1) a first depression in said top surface of said base element located adjacent to said front edge,
      (2) a second depression in said top surface of said base element located adjacent to one side edge of said two side edges,
      (3) a roller bearing attached to said seat element for movement therewith,
      (4) a spring cage biasing said roller element into rolling contact with said top surface of said base element, and
      (5) an arcuate track defined in said top surface of said base element and connecting said depressions together.

2. The seat accessory defined in claim 1 wherein said center section is planar.

3. The seat accessory defined in claim 2 wherein said top rim curves outward from said wall.

4. The seat accessory defined in claim 2 wherein said leg support sections are concave with respect to said top rim and said divider section is convex with respect to said top rim.

5. The seat accessory defined in claim 1 wherein said transfer position and said traveling position are spaced apart from each other by 90°.

6. The seat accessory defined in claim 1 wherein said arcuate wall section has a circular radius of curvature.

7. The seat accessory defined in claim 1 wherein said arcuate leg support sections are curved in at least two planes, including a first plane having an upright radius of curvature and a second plane having a radius of curvature extending at an angle with respect to said first plane's radius of curvature.

8. The seat accessory defined in claim 7 wherein said leg support sections are hyperbolic-parabaloids.

9. The seat accessory defined in claim 1 wherein said bearing is a lazy-susan bearing.

10. The seat accessory defined in claim 1 wherein said leg support sections are sloped back toward said center section to tilt a user toward said center section.

11. The seat accessory defined in claim 1 wherein seat said element is saddle-shaped.

12. The seat accessory defined in claim 1, wherein said front edge is sinuous.

13. The seat accessory defined in claim 12 wherein said wall includes a rear portion that tilts at an angle to said base element at between 105° and 107°.

14. The seat accessory defined in claim 13 wherein said center section tilts with respect to said base at an angle of 7°.

* * * * *